United States Patent [19]

Patel et al.

[11] Patent Number: 5,470,894
[45] Date of Patent: * Nov. 28, 1995

[54] LOW VOC (VOLATILE ORGANIC COMPOUNDS), SOLVENT-BASED CPVC PIPE ADHESIVES WHICH MAINTAIN JOINT ADHESIVE PERFORMANCE

[76] Inventors: Naresh D. Patel, 9223 Paso Robles Ave., Northridge, Calif. 91325; Mark D. Brown, 9216 Tweedy La., Downey, Calif. 90240

[*] Notice: The portion of the term of this patent subsequent to Oct. 12, 2010, has been disclaimed.

[21] Appl. No.: 299,791

[22] Filed: Aug. 31, 1994

Related U.S. Application Data

[63] Continuation-in-part of Ser. No. 122,139, Sep. 15, 1993, abandoned, which is a continuation-in-part of Ser. No. 837,810, Feb. 18, 1992, Pat. No. 5,252,634.

[51] Int. Cl.$^6$ .............................. C08J 9/32; C08K 5/34; C08K 5/15; C08K 5/20
[52] U.S. Cl. ................ 523/218; 524/104; 524/113; 524/233; 524/314; 524/360; 524/361; 524/365; 524/425; 524/445; 524/527; 524/567; 524/569
[58] Field of Search ................ 523/218, 219; 524/104, 113, 233, 314, 360, 361, 365, 425, 445, 492, 493, 527, 567, 569

[56] References Cited

U.S. PATENT DOCUMENTS

| | | | |
|---|---|---|---|
| 3,917,005 | 3/1973 | Knight | 524/113 |
| 3,726,826 | 4/1973 | Knight | 524/113 |
| 3,765,983 | 10/1973 | Putzier | 156/293 |
| 4,209,437 | 1/1980 | Fischer | 524/569 |
| 4,672,084 | 6/1987 | Dierdorf et al. | 524/113 |
| 4,675,354 | 6/1987 | Sperling | 524/99 |
| 4,687,798 | 8/1987 | King, Sr. | 524/100 |
| 4,910,244 | 3/1990 | Dierdorf et al. | 524/178 |
| 5,077,331 | 12/1991 | Fahey et al. | 524/569 |

FOREIGN PATENT DOCUMENTS

| | | | |
|---|---|---|---|
| 0046957 | 3/1982 | European Pat. Off. | 524/567 |
| 370844A | 5/1990 | European Pat. Off. | C08J 5/12 |
| 49-011931 | 2/1974 | Japan . | |
| 53088042 | 1/1977 | Japan . | |
| 54111543 | 2/1978 | Japan . | |
| 59187067 | 4/1983 | Japan . | |

*Primary Examiner*—Peter A. Szekely
*Attorney, Agent, or Firm*—Benman Collins & Sawyer

[57] ABSTRACT

A CPVC adhesive for joining CPVC pipes comprises: (a) about 18 to 28 wt % CPVC resin; (b) a high vapor pressure solvent comprising about 15 to 35 wt % tetrahydrofuran and 0 to about 30 wt % methyl ethyl ketone; and (c) a low vapor pressure solvent comprising about 20 to 45 wt % cyclohexanone, 0 to about 30 wt % N-methyl pyrrolidone, and 0 to 10 wt % dibasic esters (a mixture of refined dimethyl esters of adipic, glutaric, and succinic acids). The VOC level of the CPVC adhesive composition of the invention is at or below the allowed maximum value of 450 g/l, yet the adhesive meets or exceeds required performance standards, such as hydrostatic burst strength and hydrostatic sustained pressure test.

18 Claims, No Drawings ns which contain the element carbon excluding methane, carbon monoxide, carbon dioxide, carbonic acid, metallic carbides and carbonates, ammonium carbonate, and exempt compounds, such as methylene chloride and 1,1,1-trichloroethane. While other solvents, such as cyclohexanone, may also be used in such adhesives, the amounts of such solvents are typically minor, considerably less than 10 wt % of the total adhesive concentration. Typical VOC values of present commercial CPVC solvent adhesives range from 775 to 850 grams/liter (g/l).

LOW VOC (VOLATILE ORGANIC COMPOUNDS), SOLVENT-BASED CPVC PIPE ADHESIVES WHICH MAINTAIN JOINT ADHESIVE PERFORMANCE

CROSS-REFERENCE TO RELATED APPLICATION

This is a continuation-in-part of application Ser. No. 08/122,139 filed on Sep. 15, 1993, now abandoned, which in turn is a continuation-in-part of application Ser. No. 07/837,810, filed Feb. 18, 1992, now U.S. Pat. No. 5,252,634, issued Oct. 12, 1993.

TECHNICAL FIELD

The present invention relates generally to thermoplastic pipe adhesives, and, more particularly, to adhesives used for joining CPVC (chlorinated polyvinyl chloride) pipe. Specifically, the CPVC pipe adhesives disclosed and claimed herein are solvent-based, having an environmentally-acceptable VOC (volatile organic compounds) content.

BACKGROUND ART

Solvent-based adhesives, or cements, have been in use for joining thermoplastic pipe for over 30 years. The development of these adhesives is largely responsible for growth of the thermoplastic pipe industry. Several billion pounds of plastic pipe are produced each year in North America. Rapid-setting, solvent-based adhesives weld the pipes together in a timely manner. These rapid-setting adhesives allow for the testing and trouble-shooting of piping systems in a matter of hours while maintaining the long-term durability of the pipe itself. These characteristics, rapid set, ease of use, long-term durability along with low-cost, have made the joining of plastic pipe by solvent-based adhesives a practical and economic system.

The solvent-based adhesives work primarily by two means of action. First, the solvent portion of the formulation softens the outer surfaces of the pipe through solvation of the plastic. Subsequently, the adhesive joint 'cures' (hardens) by means of the solvents evaporating to the surrounding atmosphere from the pipe. Secondly, the resin dissolved in the adhesive dries through solvent evaporation and provides continuity between the welded pipe surfaces which aid in preserving the integrity of the entire pipe system.

These adhesives cure rapidly (within a matter of hours), often allowing piping systems to be tested the same day as constructed. However, perhaps the most important benefit of these solvent-based adhesives is the maintenance of the integrity of the pipe itself. The resin is the same as the plastic pipe and/or fitting material. This provides a high degree of long-term durability for the piping system, often up to 30 to 40 years of useful life. This is essential for these systems which are built into the structures of homes and buildings, or are buried underground.

Thousands of miles of thermoplastic piping systems are constructed each day throughout the world, primarily by the means previously described. These systems are used in the transfer of potable water for drinking; residential hot and cold water systems; drain, waste, and vent (DWV) applications in home and industry; turf and agricultural sprinkler systems; jacuzzi, spa and tub connections, residential and commercial fire sprinkler systems; etc. These systems are crucial to the maintenance of safe and healthy means of transport of water and other chemicals throughout the world.

Evaporation of solvents from adhesives is a concern to an environmentally-concerned world, along with all other potential sources of air pollution. Typical solids (non-volatile) contents of plastic pipe adhesives are 10 to 20% for CPVC. The balance of the formulation is solvent. By definition, the solvents normally used, e.g., tetrahydrofuran (THF), methyl ethyl ketone (MEK), and acetone are considered to be VOCs. That is, they are volatile compounds Regulations are being created throughout North America regarding allowable VOC levels in adhesive formulations. Federal, state, and local agencies are beginning to adopt strict measures to drastically reduce these levels. The South Coast Air Quality Management District (SCAQMD) in the Los Angeles area has been a leader of the establishment of rules governing VOCs, such as SCAQMD Rule 1168.

SCAQMD Rule 1168 specifies a VOC level for CPVC adhesives of 450 g/l or less, as determined by Method 316-A. All CPVC adhesives used after Jan. 1, 1994, are required to meet that maximum allowed level.

Thus, a CPVC adhesive for joining CPVC pipes having a maximum VOC level of 450 g/l is required. Yet, such adhesive must also meet the required hydrostatic burst strength and other performance criteria set forth in ASTM F-493 and D-2846.

DISCLOSURE OF INVENTION

In accordance with the invention, a CPVC adhesive for joining CPVC pipes is provided. The CPVC adhesive comprises:

(a) about 18 to 28 wt % CPVC resin;

(b) a high vapor pressure solvent comprising about 15 to 35 wt % tetrahydrofuran and 0 to about 30 wt % methyl ethyl ketone, with the total high vapor pressure solvent concentration not exceeding a maximum concentration of about 55 wt % of the total adhesive composition; and (c) a low vapor pressure solvent comprising about 20 to 45 wt % cyclohexanone, 0 to about 30 wt % N-methyl pyrrolidone, and 0 to about 10 wt % dibasic esters, with the total low vapor pressure solvent concentration at least about 20 wt % of the total adhesive composition.

The VOC level of the CPVC adhesive compositions of the invention does not exceed the maximum allowed value of 450 g/l. The hydrostatic burst strength of the CPVC adhesives meets or exceeds the required values of ASTM F-493 and D-2846.

BEST MODES FOR CARRYING OUT THE INVENTION

The major portion of solvent emission from solvent-based thermoplastic pipe adhesives occurs during application of the adhesive to the pipe. The sources of these emissions are the primer used to prepare the pipe surface, open containers filled with adhesive, as well as the bead applied to the pipe and fittings themselves, including spillage of adhesive onto the ground during application. Once the pipe and fittings are welded together, the contribution from the adhesive in the joint is minimal. The majority of the solvent remaining in the adhesive bead is absorbed into the substrates.

Current adhesives and primers incorporate the use of highly volatile solvents as major portions of formulations. Typically, THF is a primary component of any CPVC pipe adhesive.

THF is highly volatile at 20° C. with a vapor pressure of 143 mm Hg (THF). Co-solvents currently used are acetone (vapor pressure of 185 mm Hg) and methyl ethyl ketone (vapor pressure of 70 mm Hg). Comparatively minor amounts (less than 10 wt %) of cyclohexanone (vapor pressure of 2 mm Hg) are often used in prior art CPVC cement compositions. Typical prior art CPVC formulations have VOC composite partial pressures of between 120 and 160 mm Hg at 20° C.

In accordance with the invention, adhesives for sealing CPVC pipes are formulated by incorporating higher levels of CPVC resin than presently used and higher levels of low vapor pressure solvents, such as cyclohexanone and/or N-methyl pyrrolidone, than presently used. Finally, dibasic esters are optionally incorporated in the adhesive of the invention as an additional low vapor pressure solvent.

Specifically, the adhesive of the invention comprises:

(a) about 18 to 28 wt % CPVC resin;

(b) a high vapor pressure solvent comprising about 15 to 35 wt % tetrahydrofuran and 0 to about 30 wt % methyl ethyl ketone, with the total high vapor pressure solvent concentration not exceeding a maximum concentration of about 55 wt % of the total adhesive composition; and (c) a low vapor pressure solvent comprising about 20 to 45 wt % cyclohexanone, 0 to about 30 wt % N-methyl pyrrolidone, and 0 to about 10 wt % dibasic esters, with the total low vapor pressure solvent concentration at least about 20 wt % of the total adhesive composition.

As indicated above, the CPVC concentration ranges from about 18 to 28 wt % of the total adhesive, which is higher than the maximum concentration employed in the prior art adhesives. At least 18 wt % is required to keep the VOC level of the adhesive below the permitted maximum level of 450 g/l. Greater than about 28 wt % is not soluble in the solvent system and tends to form a 'gel'. Preferably, the CPVC concentration ranges from about 20 to 25 wt % of the total adhesive.

Any of the CPVC resins commonly employed in CPVC adhesives may be used in the practice of the invention. Particularly preferred are those CPVC resins characterized by an inherent viscosity (IV) ranging from about 0.6 to 0.95. (Inherent viscosity is a measure of molecular weight: the higher the IV, the higher the molecular weight.)

The chlorination level of the CPVC resin employed ranges from about 67 to 70%, as is common in the present commercially available CPVC cement formulations.

The solvent system employed in the CPVC adhesive of the invention includes at least one high vapor pressure solvent comprising about 15 to 35 wt % tetrahydrofuran and 0 to about 30 wt % methyl ethyl ketone, with the total high vapor pressure solvent concentration not exceeding a maximum concentration of about 55 wt % of the total adhesive composition.

THF is present in an amount ranging from about 15 to 35 wt %. Less than about 15 wt % does not etch or soften the CPVC pipe adequately at freezing and sub-freezing temperatures, while greater than about 35 wt % results in VOC levels in the adhesive of greater than about 450 g/l.

MEK ranges from 0 to about 30 wt %. This solvent is not a true solvent for the resin system, but is added to improve brushability of the adhesive onto the CPVC pipe. Greater than about 30 wt % of MEK tends to increase the VOC level to unacceptable values. The high vapor pressure of MEK of 70 mm Hg is offset by limiting the maximum concentration of this solvent to 30 wt % or less.

The solvent system employed in the CPVC adhesive of the invention also includes at least one low vapor pressure solvent comprising about 20 to 45 wt % cyclohexanone, 0 to about 30 wt % N-methyl pyrrolidone, and 0 to 10 wt % dibasic esters, with the total low vapor pressure solvent concentration at least about 20 wt % of the total adhesive composition.

Cyclohexanone ranges from about 20 to 45 wt %. Cyclohexanone, like THF, is a true solvent for CPVC resin. Less than about 20 wt % results in an adhesive composition having an unacceptably high VOC level. Greater than about 45 wt % does not etch or soften the CPVC pipe adequately at freezing and sub-freezing temperatures.

The low vapor pressure solvent N-methylpyrrolidone (NMP) allows the continuance of using conventional CPVC resins to maintain the integrity of welded joints. Furthermore, it, like cyclohexanone, eliminates the need for primers due to the slow, deep penetration of these solvents into the pipe itself. NMP ranges from 0 to about 30 wt %. Greater than about 30 wt % reduces stability, or shelf life, of the adhesive. Further, at freezing and sub-freezing temperatures, it takes considerably longer to develop joint strength to withstand pressure.

Dibasic esters (DBE) are solvents that improve stability of the adhesive in the container and reduce VOC emissions of the adhesive.

The DBE component of the adhesive consists of a mixture of at least two refined dimethyl esters selected from the group consisting of adipic, glutaric, and succinic acids. These dibasic esters are available from Du Pont Chemicals (Wilmington, Del.). For example, Du Pont offers a dimethyl ester mixture with the trade designation DBE-2SPG which contains 20–35 wt % dimethyl adipate, 65–80 wt % dimethyl glutarate, and 0–3 wt % dimethyl succinate and, as such, is suitably employed in the practice of the invention. Another dimethyl ester mixture suitably employed in the practice of the invention has the trade designation DBE and contains 10 to 25 wt % dimethyl adipate, 55 to 75 wt % dimethyl glutarate, and 19 to 26 wt % dimethyl succinate. The dibasic esters are characterized by a low vapor pressure (<0.3 Torr at 20° C.) and low VOC emissions.

The dibasic ester component ranges from 0 to about 10 wt %. At concentrations greater than about 10 wt %, it takes considerably longer at freezing and sub-freezing temperatures to develop joint strength to withstand pressure. Preferably, the DBE component ranges from about 2 to 10 wt %.

The CPVC adhesive of the invention may include additional solids. Such additional solids that may be present include fillers, thixotropic agents, pigments, stabilizers, and the like. Up to about 8 wt % of the adhesive may contain such additional solids. Thus, the total solids content (resin plus the additional solids) in the adhesive of the invention ranges from about 18 to 36 wt %. Any of the solids (fillers, thixotropic agents, pigments, stabilizers, etc.) commonly used in CPVC adhesives may be employed in the practice of the present invention.

Preferred fillers include low specific gravity hollow ceramic spheres and calcium carbonate. Preferred pigments include titanium dioxide, carbon black dispersion, orange color dispersion, yellow color dispersion, and red color dispersion.

The thixotropic agents, such as fumed silica and precipitated silica (e.g., Cab-o-Sil, Aerosil, and Hi-Sil) and treated bentonite clay (e.g., Bentone 27) may be used at low levels to obtain optimum flow properties, especially with regard to controlling spillage from the pipe upon application.

Low vapor pressure solvents (cyclohexanone, NMP, and DBE) help accomplish the monumental task of formulating adhesives which volatilize at a substantially reduced rate. Combining these solvents with the more conventional solvents THF and MEK at reduced concentrations significantly lowers the emissions derived from adhesives used in the plastic pipe industry while meeting or exceeding the standards of the industry. Thixotropic agents formulated into these adhesives make a tangible contribution to lowering the emissions through controlling spillage. These changes to current formulations are minimal to the end user from the standpoint of application, testing, economics, and long-term durability and liability.

The adhesive formulations of the invention lower the VOC level to 450 g/l or less, while meeting or exceeding certain standards such as ASTM F-493 and D-2846 which regulate adhesives used in the plastic pipe industry, specifically, hydrostatic burst strength and hydrostatic sustained pressure test.

Most of the adhesives of the invention have a composite vapor pressure of less than about 85 mm Hg, which is considerably lower than that of presently-available CPVC adhesives, which tend to have composite vapor pressures on the order of 120 mm Hg and higher.

Preferred compositions of the invention are given by the following sets of compositions: (a) 19 to 32 wt % CPVC, 24 to 29 wt % THF, 5 to 29 wt % MEK, 20 to 42 wt % cyclohexanone, and 4 to 5 wt % additional solids; (b) 21 to 25 wt % CPVC, 18 to 22 wt % THF, 0 to 17 wt % MEK, 18 to 37 wt % cyclohexanone, 18 to 29 wt % NMP, and 2 to 3 wt % additional solids; (c) 19 to 24 wt % CPVC, 18 to 35 wt % THF, 7 to 17 wt % MEK, 18 to 27 wt % cyclohexanone, 0 to 14 wt % NMP, 3 to 10 wt % dibasic esters, and 2 to 7 wt % additional solids; and (d) 16 to 20 wt % CPVC, 15 to 20 wt % THF, 18 to 22 wt % MEK, 27 to 34 wt % cyclohexanone, 3 to 9 wt % dibasic esters, and 4 to 6 wt % additional solids.

The adhesives of the invention are advantageously made in a batch process. The solvents are charged one at a time to the mixing tank and blended for a short period of time to achieve a state of equilibrium. The resin is then charged to the mixer and mixed with high shear dispensers to achieve complete dissolution in the solvent system. At this point, the pigments and fillers (if needed) are added and dispersed to ensure substantially uniform dispersion. The thixotropic agent (if needed) is added last and dispersed to achieve the desired flow characteristics.

The adhesives of the invention are useful in joining CPVC pipe in all CPVC applications, including, but not limited to, hot and cold water plumbing systems (residential) ranging from ½ to 2 inch pipe and CPVC fire sprinkler systems ranging from ¾ to 3 inch pipe (residential and commercial). The joint is readily made and quickly placed into service. The adhesives of the invention are applied to the CPVC joints in the same way as other commercial CPVC adhesives.

Within about 15 minutes of applying the adhesive of the invention, it is possible to carry out pressure tests. Further, no primer is needed. Consequently, the adhesive of the invention may be considered to be a one-step cement, in contrast to prior art formulations, which require a primer and hence are two-step cements. Without subscribing to any particular theory, it appears that the higher level of low vapor pressure solvent etches the pipe and/or fitting in the same manner that the primer does.

The adhesives of the invention maintain the shelf stability associated with presently used CPVC adhesives and meets or exceeds performance requirements while exhibiting desirably lower VOC levels. Specifically, the adhesives meet ASTM F-493 and D-2846 performance standards and they meet VOC regulations such as those published by South Coast Air Quality Management District Rule 1168, and are expected to meet the eventual regulations of Ventura County and San Diego Air Quality Management Districts (both in California), when published.

These adhesives are considered to be fast curing; for example, in hot and cold residential plumbing systems, curing takes about 15 to 30 minutes, which allows for pressure testing in a short period of time, compared to presently-available CPVC adhesives.

EXAMPLES

Examples 1–8

The following compositions listed in Table I below exemplify the compositions of the invention. The additional ("add'l") solids include the total of pigments, fillers, thixotropic agents, and stabilizers. Table I also includes the viscosity of the adhesive (as measured by a Brookfield viscometer) and the composite vapor pressure in mm of Hg.

The hydrostatic burst strength (in psi) was measured at two temperatures: room temperature (73° F., or 22.8° C.) and 180° F. (82.2° C.) on joining 2 inch CPVC Schedule 80 pipe after 2 hours drying at the indicated temperature. For comparison, the minimum ASTM required value per ASTM F-493 is 400 psi (73° F.) and 200 psi (180° F.).

The hydrostatic sustained pressure was conducted at 180° F. (82.2° C.) on joining ½ inch CPVC pipe per ASTM D-2846. For meeting the requirement per ASTM F-493 and D-2846, the assembly was maintained in water at 180° F. for 4 hours at 364 psi. A pass/fail indication suffices to indicate whether the test is met.

The VOC level (in g/l) was measured, using Method 316A, as provided in Rule 1168 of SCAQMD. For comparison, the maximum VOC level permitted is 450 g/l.

The results of the hydrostatic and VOC measurements are shown in Table I.

TABLE I

Composition and Viscosity of CPVC Adhesives.

| Components | Examples | | | | | | | |
|---|---|---|---|---|---|---|---|---|
| | 1 | 2 | 3 | 4 | 5 | 6 | 7 | 8 |
| CPVC 0.65 IV | 21.0 | 21.0 | 21.0 | 23.0 | 23.0 | 23.0 | 22.0 | 21 |
| THF | 27.0 | 26.5 | 27.0 | 20.0 | 20.0 | 20.0 | 20.0 | 35 |
| MEK | 21.0 | 26.5 | 7.0 | 0 | 0 | 15.0 | 9.0 | 12 |
| Cyclohexanone | 27.0 | 22.0 | 40.0 | 27.0 | 34.5 | 20.0 | 25.0 | 20 |
| NMP | 0 | 0 | 0 | 27.0 | 20.0 | 20.0 | 12.0 | 0 |
| DBE-2 SPG | 0 | 0 | 0 | 0 | 0 | 0 | 10.0 | 5 |
| Add'l solids | 4.0 | 4.0 | 5.0 | 3.0 | 2.5 | 2.0 | 2.0 | 7 |
| Total | 100 | 100 | 100 | 100 | 100 | 100 | 100 | 100 |
| Total solids level | 25.0 | 25.0 | 26.0 | 26.0 | 25.4 | 25.0 | 24.0 | 28 |

TABLE I-continued

Composition and Viscosity of CPVC Adhesives.

| Components | \multicolumn{8}{c}{Examples} | | | | | | | |
|---|---|---|---|---|---|---|---|---|
| | 1 | 2 | 3 | 4 | 5 | 6 | 7 | 8 |
| Viscosity (cp) | 1520 | 2080 | 2440 | 1400 | 1360 | 1000 | 1440 | 1880 |
| Composite vapor pressure, mm Hg | 79 | 82 | 70 | 49 | 49 | 61 | 58 | 92 |
| Hydrostatic burst strength, psi: | | | | | | | | |
| 73° F. | 510 | 470 | 430 | 420 | 420 | 430 | — | 525 |
| 180° F. | 310 | 320 | 320 | 275 | 280 | 315 | — | 320 |
| Hydrostatic sustained pressure | pass | pass | pass | — | pass | — | — | pass |
| VOC level (g/l) | 404 | 437 | 394 | 322 | 311 | 355 | 387 | 415 |

The compositions of the invention are seen to maintain and in many cases exceed ASTM F-493 and NDP D-2846 performance requirements and to evidence VOC levels below 450 g/l.

Comparative Example 9

A comparative evaluation was made between a CPVC adhesive composition of the invention (Example 1, above) and a CPVC adhesive composition that is presently commercially available. The prior art composition comprised 15 wt % CPVC resin, 65 wt % THF, 11 wt % MEK, 8 wt % cyclohexanone, 1 wt % additional solids.

Two CPVC size pipes were cemented together, ½ inch CTS (copper tube size) and ¾ inch CTS. Hydrostatic burst strength was measured after cure times of 0.5, 2, 24, and 72 hours. The results are set forth in Table II below.

TABLE II

Comparative Evaluation - CPVC CTS Joints: Hydrostatic Burst Strength.

| CPVC-CTS | Cure Time | Composition | |
|---|---|---|---|
| | | Prior Art | Example 1 |
| ½ in. CTS | 0.5 hr. | 850 psi | 850 psi |
| " | 2 hrs. | 1,000 psi | 1,300 psi |
| " | 24 hrs. | 1,800 psi | 1,750 psi |
| " | 72 hrs. | 1,900 psi | 1,950 psi |
| ¾ in. CTS | 0.5 hr. | 500 psi | 800 psi |
| " | 2 hrs. | 950 psi | 1,175 psi |
| " | 24 hrs. | 1,500 psi | 1,500 psi |
| " | 72 hrs. | 1,500 psi | 1,500 psi |

It is evident from the results shown in Table II that the composition of the invention evidences substantially the same hydrostatic burst strength, and in some cases, higher burst strength, compared with a prior art composition.

Comparative Examples 10–13

Four CPVC-based adhesives, having the formulations indicated in Table III on the following page, were prepared. Table III summarizes viscosities, hydrostatic burst test results, and volatile organic compound (VOC) emissions for each of the adhesives. The industry standards for hydrostatic burst tests and VOC emissions are given above in Examples 1–8.

TABLE III

COMPOSITION AND PROPERTIES OF CPVC ADHESIVE EXAMPLES OUTSIDE THE SCOPE OF THE INVENTION

| EXAMPLES | 10 | 11 | 12 | 13 |
|---|---|---|---|---|
| Ingredients (wt %) | | | | |
| CPVC Resin (Inherent Visc. = 0.65) | 15 | 31 | 18 | 28 |
| High VP Solvent | | | | |
| Tetrahydrofuran | 35 | 35 | 62 | 25 |
| Methyl ethyl ketone | 15 | 10 | 0 | 30 |
| Total High VP Solvent | 50 | 45 | 62 | 55 |
| Low VP Solvent | | | | |
| Cyclohexanone | 35 | 24 | 20 | 17 |
| Total Solvent | 85 | 69 | 82 | 72 |
| Characteristics: | | | | |
| Viscosity, cp | 120 | NA[1] | 240 | NA |
| Hydrostatic Burst Pressure Test | Failed | NA | Passed | NA |
| VOC Level, g/l | 441 | NA | 467 | NA |

Notes:
[1]The entry "NA" indicates that the sample formulation gelled upon cooling to room temperature so that the sample is not a viable adhesive formulation.

[2]The hydrostatic burst pressure test was conducted at room temperature and at 180° F. (82.2° C.) on joining 2 inch CPVC pipe per ASTM F-493. For meeting the requirement per ASTM F-493, the assembly is filled with water at the designated temperature and the burst strength measured after curing for 2 hours. The minimum acceptable strength at room temperature is 400 psi and at 180° F. is 200 psi. A pass/fail indication suffices to indicate whether the test is met.

Comparative Examples 10 and 11 are considered to fall outside the scope of the present invention, which provides that the CPVC resin content must be greater than 18 wt % but less than 28 wt % CPVC resin, which does not meet the minimum requirement of 18 wt % resin. Comparative Example 11 failed to meet the industry minimum standards for hydrostatic sustained pressure, while its VOC emissions of 441 g/l met the VOC maximum guideline of 450 g/l by a slight margin. Comparative Example 11 contained 31 wt % CPVC resin, which exceeds the 28 wt % maximum limit. Comparative Example 11 gelled upon cooling to room temperature and therefore does not represent a viable formula for a CPVC-based adhesive.

Comparative Example 12 is considered to fall outside the scope of the invention, which provides that the total high vapor pressure solvent concentration must not exceed 55 wt % of the adhesive. Comparative Example 12 contained 62 wt % of tetrahydrofuran, a high vapor pressure solvent, thereby exceeding the maximum limit for total high vapor pressure solvent provided in the claims of the application. Consequently, Comparative Example 12 exceeded the maximum allowable VOC emissions standard of 450g/l by exhibiting VOC emissions of 467 g/l.

Comparative Example 13 is considered to fall outside the scope of the above-identified patent application, which provided that the total low vapor pressure solvent concentration must be at least 20 wt % of the adhesive. Comparative Example 13 contained only 17 wt % of cyclohexanone, a low vapor pressure solvent. Thus, Comparative Example 13 does not meet the minimum requirement for total low vapor pressure solvent provided in the claims of the application. Comparative Example 13 gelled upon cooling to room temperature and therefor does not represent a viable formula for a CPVC-based adhesive.

Examples 14–15

The following formulations, comprising comparatively low amounts of THF, were prepared. The compositions and their properties are listed in Table IV, below.

TABLE IV

LOW THF COMPOSITIONS OF THE INVENTION.

| EXAMPLE | 14 | 15 |
|---|---|---|
| Ingredients | | |
| CPVC 0.65 IV | 19 | 18 |
| THF | 20 | 20 |
| MEK | 18 | 20 |
| Cyclohexanone | 32 | 31.5 |
| DBE[1] | 7 | 5 |
| Stabilizers | 2.3 | 2.3 |
| Pigments | 0.7 | 0.7 |
| Fumed Silica | 1 | 2.5 |
| Total | 100.0 | 100.0 |
| Viscosity (η), cps | 900 | 1,900 |
| Spindle speed | 3 @ 30 | 3 @ 30 |
| Sp. gravity | 0.989 | 0.991 |
| Stability | | |
| @ 0° F. | | OK on 5th day |
| @ 40° F. | OK on 30th day | OK on 60th day |
| @ 120° F. (for 30 days) | OK; η = 880 | OK; η = 1,640 |
| VOC Level | 424 | 420 |
| Remarks | Meets ASTM F-493 | Meets ASTM F-493 |

Note:
[1]The dibasic esters employed comprised the designation "DBE".

The foregoing Examples 14 and 15 meet the requirements of certain European countries of a maximum of 20 wt % tetrahydrofuran, and are suitably employed as CPVC adhesives.

INDUSTRIAL APPLICABILITY

The CPVC adhesives of the invention are expected to find use in joining CPVC pipes together.

Thus, there has been disclosed a CPVC adhesive for bonding CPVC articles to CPVC articles. It will be readily apparent to those skilled in this art that various changes and modifications of an obvious nature may be made, and all such changes and modifications are considered to fall within the scope of the invention, as defined by the appended claims.

What is claimed is:

1. A chlorinated polyvinyl chloride (CPVC) adhesive for joining CPVC pipes consisting essentially of:

(a) about 18 to 28 wt % CPVC resin;

(b) a high vapor pressure solvent consisting essentially of about 15 to 35 wt % tetrahydrofuran and 0 to about 30 wt % methyl ethyl ketone, with the total high vapor pressure solvent concentration not exceeding a maximum concentration of about 55 wt % of said adhesive;

(c) a low vapor pressure solvent consisting essentially of about 20 to 45 wt % cyclohexanone, 0 to about 35 wt % N-methyl pyrrolidone, and 0 to about 10 wt % of a mixture of at least two refined dimethyl esters selected from the group consisting of adipic, glutaric, and succinic acids, with the total low vapor pressure solvent concentration at least about 20 wt % of said adhesive; and (d) up to about 8 wt % of at least one component selected from the group consisting of pigments, fillers, thixotropic agents, and stabilizers, said adhesive having a volatile organic compound concentration not exceeding 450 g/l.

2. The CPVC adhesive of claim 1 wherein said CPVC resin consists essentially of CPVC resin having a molecular weight value ranging from about 0.6 to 0.95 as measured by inherent viscosity.

3. The CPVC adhesive of claim 1 wherein said CPVC resin ranges from about 20 to 25 wt % in concentration.

4. The CPVC adhesive of claim 1 wherein said thixotropic agent is selected from the group consisting of fumed silica, precipitated silica, and treated bentonite clay.

5. The CPVC adhesive of claim 1 wherein said filler is selected from the group consisting of low specific gravity hollow ceramic spheres and calcium carbonate.

6. A method for reducing volatile organic compound emissions from chlorinated polyvinyl chloride (CPVC) pipe adhesives, wherein said adhesive is formulated by combining (a) a resin component consisting essentially of about 18 to 28 wt % CPVC resin;

(b) a high vapor pressure solvent consisting essentially of about 15 to 35 wt % tetrahydrofuran and 0 to about 30 wt % methyl ethyl ketone, with the total high vapor pressure solvent concentration not exceeding a maximum concentration of about 55 wt % of said adhesive;

(c) a low vapor pressure solvent consisting essentially of about 20 to 45 wt % cyclohexanone, 0 to about 35 wt % N-methyl pyrrolidone, and 0 to about 10 wt % of a mixture of at least two refined dimethyl esters selected from the group consisting of adipic, glutaric, and succinic acids, with the total low vapor pressure solvent concentration at least about 20 wt % of said adhesive; and (d) up to about 8 wt % of at least one component selected from the group consisting of pigments, fillers, thixotropic agents, and stabilizers, said adhesive having a volatile organic compound concentration not exceeding 450 g/l.

7. The method of claim 6 wherein said CPVC resin consists essentially of CPVC resin having a molecular weight ranging from about 0.6 to 0.95 as measured by inherent viscosity.

8. The method of claim 6 wherein said CPVC resin ranges from about 20 to 25 wt % in concentration.

9. The method of claim 6 wherein said thixotropic agent is selected from the group consisting of fumed silica, precipitated silica, and treated bentonite clay.

10. The method of claim 6 wherein said filler is selected from the group consisting of low specific gravity hollow ceramic spheres and calcium carbonate.

11. The CPVC adhesive of claim 1 consisting essentially of:

(a) 19 to 32 wt % CPVC resin;

(b) 24 to 29 wt % tetrahydrofuran and 5 to 29 wt % methyl ethyl ketone;

(c) 20 to 42 wt % cyclohexanone; and (d) 4 to 5 wt % of said at least one component.

12. The CPVC adhesive of claim 1 consisting essentially of:

(a) 21 to 25 wt % CPVC resin;

(b) 18 to 22 wt % tetrahydrofuran and 0 to 17 wt % methyl ethyl ketone;

(c) 18 to 37 wt % cyclohexanone and 18 to 29 wt % N-methyl pyrrolidone; and (d) 2 to 3 wt % of said at least one component.

13. The CPVC adhesive of claim 1 consisting essentially of:

(a) 19 to 24 wt % CPVC resin;

(b) 18 to 35 wt % tetrahydrofuran and 7 to 17 wt % methyl ethyl ketone;

(c) 18 to 27 wt % cyclohexanone, 0 to 14 wt % N-methyl pyrrolidone, and 3 to 10 wt % dibasic esters; and (d) 2 to 7 wt % of said at least one component.

14. The CPVC adhesive of claim 1 consisting essentially of:

(a) 16 to 20 wt % CPVC resin;

(b) 15 to 20 wt % tetrahydrofuran and 18 to 22 wt % methyl ethyl ketone;

(c) 27 to 34 wt % cyclohexanone and 3 to 9 wt % dibasic esters; and (d) 4 to 6 wt % of said at least one component.

15. The method of claim 6 wherein said adhesive consists essentially of:

(a) 19 to 32 wt % CPVC resin;

(b) 24 to 29 wt % tetrahydrofuran and 5 to 29 wt % methyl ethyl ketone;

(c) 20 to 42 wt % cyclohexanone; and (d) 4 to 5 wt % of said at least one component.

16. The method of claim 1 wherein said adhesive consists essentially of:

(a) 21 to 25 wt % CPVC resin;

(b) 18 to 22 wt % tetrahydrofuran and 0 to 17 wt % methyl ethyl ketone;

(c) 18 to 37 wt % cyclohexanone and 18 to 29 wt % N-methyl pyrrolidone; and (d) 2 to 3 wt % of said at least one component.

17. The method of claim 1 wherein said adhesive consists essentially of:

(a) 19 to 24 wt % CPVC resin;

(b) 18 to 35 wt % tetrahydrofuran and 7 to 17 wt % methyl ethyl ketone;

(c) 18 to 27 wt % cyclohexanone, 0 to 14 wt % N-methyl pyrrolidone, and 3 to 10 wt % dibasic esters; and (d) 2 to 7 wt % of said at least one component.

18. The method of claim 1 wherein said adhesive consists essentially of:

(a) 16 to 20 wt % CPVC resin;

(b) 15 to 20 wt % tetrahydrofuran and 18 to 22 wt % methyl ethyl ketone;

(c) 27 to 34 wt % cyclohexanone and 3 to 9 wt % dibasic esters; and (d) 4 to 6 wt % of said at least one component.

* * * * *